United States Patent [19]

Suski et al.

[11] Patent Number: 5,311,775
[45] Date of Patent: May 17, 1994

[54] SEMICONDUCTOR FLOW SENSOR

[75] Inventors: Jan Suski, Antony; Minh-Trang Chau, Rungis; Didier Dominguez, Montrouge, all of France

[73] Assignee: Schlumberger Industries, Montrouge, France

[21] Appl. No.: 805,768

[22] Filed: Dec. 12, 1991

[30] Foreign Application Priority Data

Dec. 14, 1990 [FR] France ................. 90/15658

[51] Int. Cl.⁵ .............................................. G01F 1/68
[52] U.S. Cl. ...................... 73/204.26; 73/170.12; 73/861.95
[58] Field of Search ........... 73/204.23, 204.26, 861.95, 73/204.16, 189, 204.21, 170.12

[56] References Cited

U.S. PATENT DOCUMENTS

| | | | |
|---|---|---|---|
| 4,680,963 | 7/1987 | Tabata et al. ............... | 73/204.18 |
| 4,888,988 | 12/1989 | Lee et al. ................... | 73/204.26 |
| 4,890,489 | 1/1990 | Huijsiang .................. | 73/204.24 |
| 4,909,078 | 3/1990 | Sittler et al. ............... | 73/204.26 |
| 5,090,254 | 2/1992 | Gucked et al. .............. | 73/653 |

FOREIGN PATENT DOCUMENTS

| | | | |
|---|---|---|---|
| 131318 | 5/1984 | European Pat. Off. . | |
| 0103466 | 8/1980 | Japan ................. | 73/204.26 |
| 0031966 | 2/1986 | Japan ................. | 73/204.26 |
| 0085363 | 4/1988 | Japan ................. | 73/204.26 |
| WO8903512 | 4/1989 | PCT Int'l Appl. . | |

*Primary Examiner*—Stephen Chin
*Assistant Examiner*—Timothy J. May
*Attorney, Agent, or Firm*—Sanford J. Asman

[57]  ABSTRACT

The flow rate sensor is made from a silicon substrate (1). A first face (A) of the substrate is provided with a heating element (2) disposed in a first region (R1) and with at least one thermometer component (4) disposed in a second region (R2), the first and second regions being insulated from each other by a third zone (R3) of oxidized porous silicon. According to the invention, the sensor is adapted to receive the flow of fluid (E) over the second face (B) of the substrate (1), with the first and second regions (R1, R2) forming respective thermal short circuits between the first and second faces (A, B) of said substrate.

13 Claims, 5 Drawing Sheets

SEMICONDUCTOR FLOW SENSOR

BACKGROUND OF THE INVENTION

1. Field of the Invention

The invention relates to a semiconductor sensor for measuring the flow rate of a flowing fluid, e.g. a liquid or a gas.

2. Description of the Prior Art

In general, the principle of a hot-wire anemometer for measuring the flow of a fluid has been known for a long time. More recently, proposals have been made to implement semiconductor sensors based on this principle.

For example, U.S. Pat. No. 4,680,963 describes a semiconductor sensor integrating a heating resistance and associated thermometers on a single silicon substrate. The center of the face of the substrate which is subjected to the fluid flow is provided with a heating resistance, and its periphery is provided with thermometers which are isolated from the heating resistance by oxidized porous silicon. Given that the thermal conductivity of oxidized porous silicon is up to 100 times less than that of silicon, this prevents thermal short circuits occurring in the substrate between the heating resistance and the thermometers.

The sensor described above nevertheless suffers from drawbacks insofar as the heating resistance and the thermometers require a protective layer in order to avoid the implanted circuits for heating and for measuring temperature suffering problems of abrasion, of corrosion, and of ion contamination. Unfortunately, making such a layer gives rise to several difficulties. Firstly it must have thermal expansion characteristics that are substantially identical to those of the substrate to avoid measurement fluctuations because of stresses due to temperature variations. In addition, it must have good thermal conductivity so as to avoid opposing the transfer of heat between the heating resistance and the fluid; with this latter condition nevertheless presenting a drawback insofar as it gives rise to a new thermal bridge in the protective layer between the heating resistance and the thermometers.

An object of the invention is to remedy these drawbacks by proposing a solution that is effective and cheap.

The proposed flow rate sensor comprises a substrate of silicon having a first face provided with a heating element disposed in a first region of said substrate, together with at least one thermometer component disposed in a second region of the substrate, said first and second regions being insulated from each other by a third region of said substrate formed at least in part by oxidized porous silicon; according to the invention, the sensor is adapted to receive the fluid flow over the second face of said substrate, with said first and second regions forming respective thermal short circuits between the first and second faces of said substrate.

Advantageously, the third region is constituted by at least one insulating channel surrounding the first region. In a particular embodiment, the first region is substantially cylindrical with the third region being annular.

In a variant, the third region is constituted by a succession of $SiO_2$ channels separated by Si.

A cap is fixed on the first face of said substrate so as to stiffen the substrate, said cap possessing a cavity formed facing the first region and at least a portion of the third region.

Advantageously, the cavity is formed facing the first region and a portion of the third region. Advantageously, the interface between the second and third regions lies outside the cavity. When the first region is substantially cylindrical and the third region is constituted by at least one insulating channel surrounding the first region, the cavity is circular in outline.

Once the substrate has been consolidated and stiffened in this way, it may be machined to adapt it to the flow of a fluid over its second face.

In a first variant embodiment, in order to receive the fluid flow, the sensor includes a recess formed in the second face of the substrate, with all three regions opening out at the same level in the bottom of the recess.

In a particular embodiment, the recess is in the form of a cross centered on the first region and having one of its branches corresponding to the flow axis of the fluid.

In another variant embodiment, in order to receive the fluid flow, the second face of the substrate is plane, with the second face of the substrate being worked so that the thickness of the substrate is no greater than the thickness of the insulating third region.

Regardless of whether the second face is worked by forming a recess therein such that the bottom of the recess and the first face of the substrate form a membrane, or by machining the entire second face to reduce the thickness of the substrate, the working of the second face serves to provide thermal insulation laterally between the first and second regions.

Advantageously, the cap is made of silicon; the bond between the cap and the first face of the substrate may be constituted by electrostatic sealing via a fine layer of Pyrex. In a variant, the bond between the cap and the first face of the substrate may be made via a layer of siloxane deposited by centrifuging and sealed by pressure at a temperature lying in the range 200° C. to 450° C. The space between the cap and the first face may be filled with an inert gas.

The first face of the substrate may advantageously be provided with at least one thermometer component disposed in the first region.

The silicon substrate is preferably of the P-type and the heating element and the thermometer components are implanted directly in the first face of said substrate.

The invention and the advantages is provides will be better understood on reading the following detailed description which is made with reference to the figures, in which.

Figure 1:
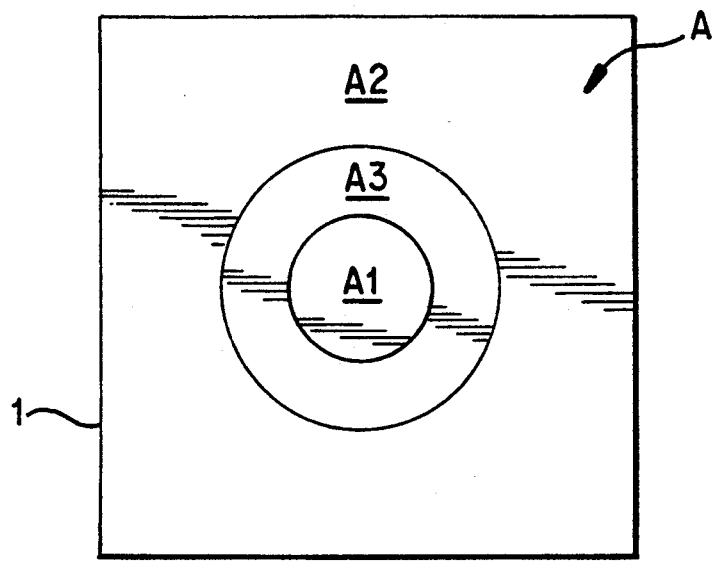
FIGS. 1 and 2 are respectively a plan view and a section view of the silicon substrate identifying the different masked areas for making a sensor of the invention.
Figure 2:
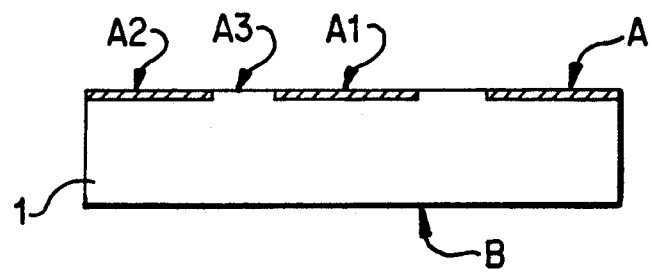
Figure 3:
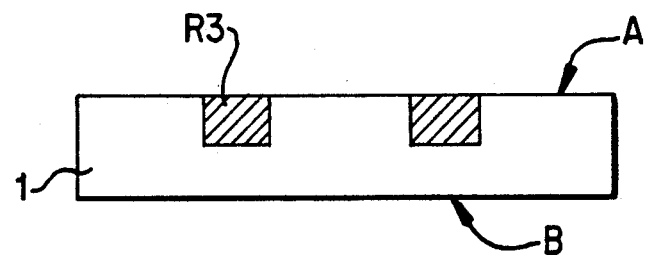
FIG. 3 is a section through the substrate of FIG. 1 showing the zone of porous silicon oxide forming the thermal barrier in the embodiment corresponding to FIGS. 1 and 2.

With reference to FIGS. 1 to 3 showing a first embodiment, the sensor is made from a substrate 1 of P-type silicon. A central circular area A1 and an outer annular area A2 are masked on face A of the substrate 1 by implanting N-type ions to a depth of about 0.3 microns, thereby leaving only one P-type intermediate annular area A3 isolating the area A1 and A2 from each other. By way of illustration, the area A1 is a circular area having a diameter of about 1 mm, and the distance between the areas A1 and A2 is about 0.5 mm.

Once masked in this way, face A of the substrate is subjected to a solution of hydrofluoric acid (HF) and to an electrical current between face B of the substrate 1 acting as an anode and the solution of hydrofluoric acid acting as a cathode. Given that this acid solution etches P-type silicon only, i.e. the zone underlying area A3, an annular channel R3 of porous silicon is thus formed. The depth of the channel R3 should be as shallow as possible in order to minimize energy consumption; by way of example, it may lie in the range 15 microns to 40 microns.

The substrate is then placed in a oxidizing furnace to oxidize the channel R3 of porous silicon in depth, thereby obtaining a channel of oxidized porous silicon R3.

Figure 4:
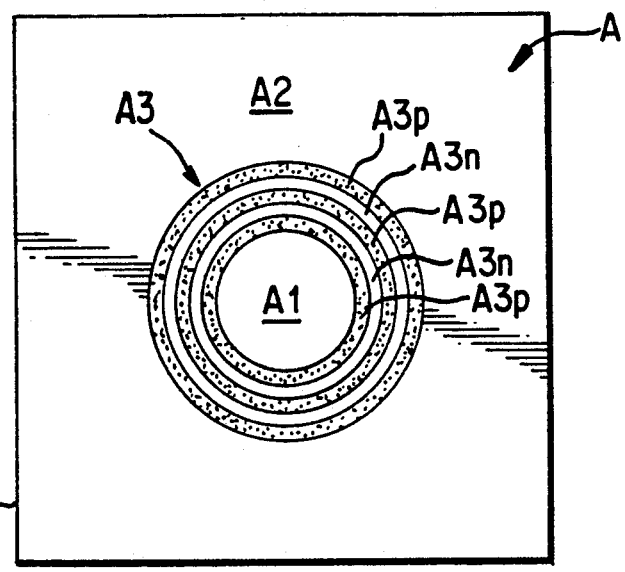
FIGS. 4 and 5 are respectively a plan view and a section view of a silicon substrate identifying the different masked areas for a variant embodiment of the sensor of the invention.
Figure 5:
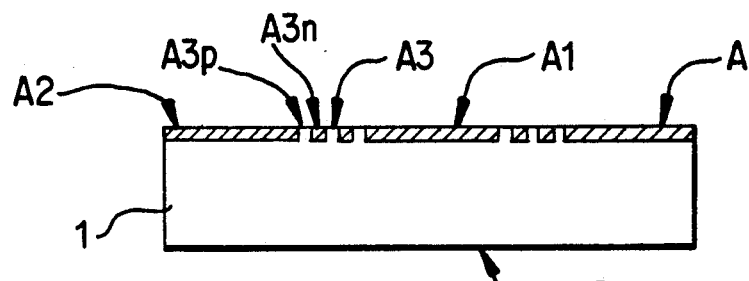
Figure 6:
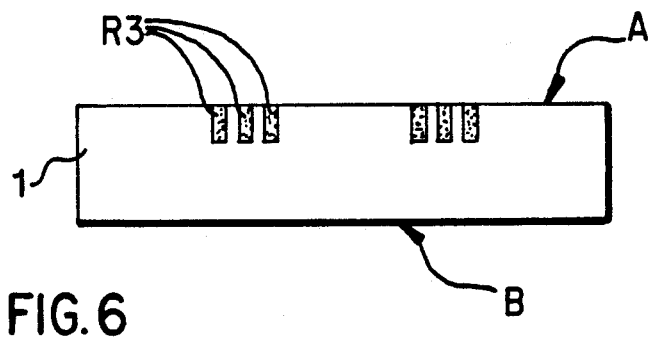
FIG. 6 is a section through the substrate of FIG. 4 showing the variant embodiment corresponding to FIGS. 4 and 5.

With reference to FIGS. 4 to 6, a second embodiment is described having a region R3 that differs from the preceding embodiment (FIGS. 1 to 3). In FIGS. 4 and 5, it can be seen that the annular area A3 is divided into successive annular areas of alternating P-type (referenced A3P) and N type (referenced A3N), with the N-type areas being made by implanting ions. Each of the areas A1 and A2 is bordered by an A3P area, i.e. an insulating area. In the same manner as before, the area A is subjected to a solution of hydrofluoric acid (HF). Thus, in this variant, it is not one but a plurality of annular channels R3 of porous oxidized silicon that are made which are separated from one another by silicon, thereby distributing the thermal stresses that result from the manufacturing method over the various $SiO_2$/Si interfaces, and thus reinforcing mechanical strength.

The number of these channels may, for example, lie in the range 3 to 5 (only three channels are shown on the example of FIG. 6).

Making these channels serves to minimize thermal stresses at the interfaces between regions of silicon and regions of oxidized porous silicon. The Si separation between the $SiO_2$ channels should be as small as possible so as to retain good thermal insulation.

Figure 7:
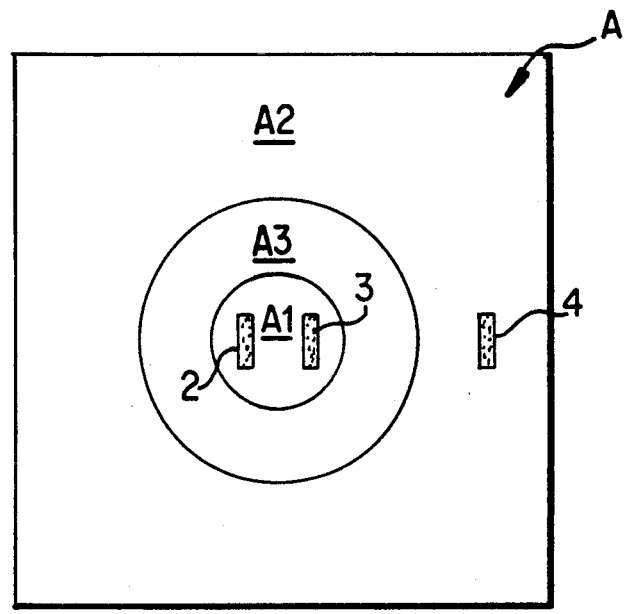
FIG. 7 is a diagrammatic plan view of the substrate after the heater element and the thermometer components have been implanted.

With reference to FIG. 7, and for either of the above embodiments, a heating element 2 is then implanted on area A1 together with at least one thermometer component 4 on area A2. It is preferable also to implant at least one thermometer component 3 on area A1.

The fact that the heating element and the thermometer components are distinct on area A1 provides great flexibility in choosing thermometers and detection methods. Advantageously, the thermometer components on areas A1 and A2 are identical in order to ensure the same measuring behavior and to facilitate data processing.

Advantageously, the heating element and the thermometer components are made in the form of components (resistances, diodes and/or transistors or even thermopiles) that are implanted directly in the silicon substrate, e.g. using CMOS or bipolar technology.

Figure 8:
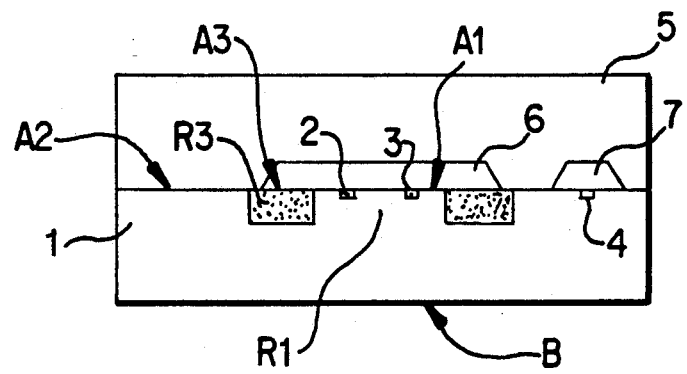
FIG. 8 is a diagrammatic section view of the FIG. 7 substrate fitted with its cap.

With reference to FIG. 8, it can be seen that once the thermometer components and the heating element have been made, a cap 5 which is preferably made of silicon is fixed in sealed manner on the first face A of the substrate 1. The cap 5 may be fixed by means of a fine layer of Pyrex or by pressure at a temperature lying in the range 200° C. to 450° C. via an intermediate layer of siloxane (spin on glass) deposited by centrifuging.

The cap naturally serves to protect the heating element and the thermometer components. However, and above all, it stiffens and consolidates the structure of the substrate 1 which can then be machined so as to be adapted to receive the fluid flow over its second face B.

The cap 5 has a central cavity 6 formed facing the first region R1 and a portion of the third region R3. The outline of the cavity is circular and the distance between the interface separating the regions R1 and R3 and the edge of the cavity is equal to about 70% of the distance between the regions R1 and R2. Another cavity 7 is formed in the cap over the thermometer component. These cavities are either filled with inert gas, e.g. argon, or else they are evacuated. Because of the cap which stiffens the substrate, the substrate is machined so as to provide good thermal insulation between the regions R1 and R2, so as to ensure good fluid flow over the second face B of the substrate, avoiding the formation of turbulence, and so as to ensure good heat conduction between the first and second faces of the substrate 1.

Figure 9:
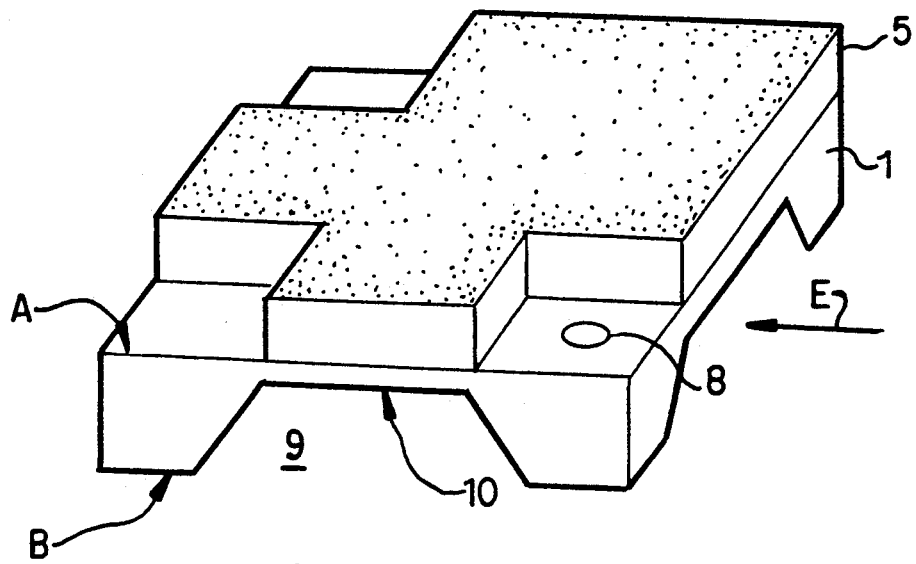
FIGS. 9 and 10 are diagrams respectively comprising a perspective view and a plan view of a variant embodiment of a sensor of the invention.
Figure 10:
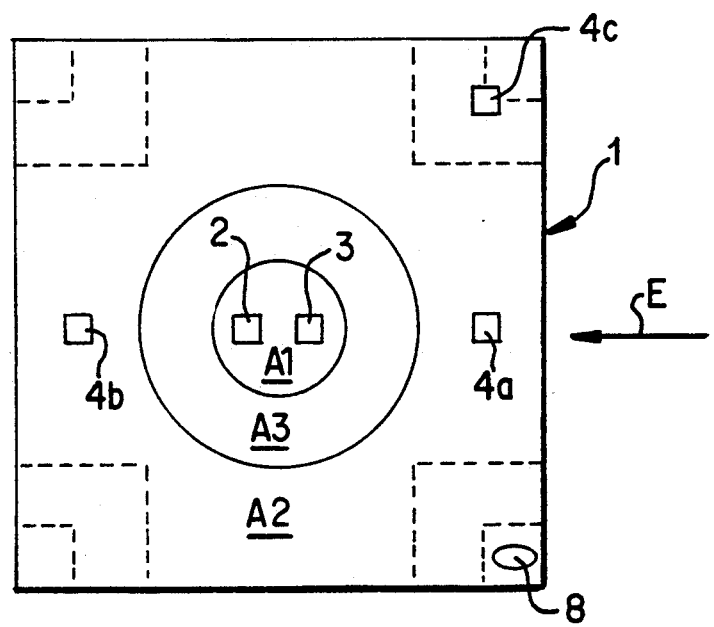

FIGS. 9 and 10 are diagrams respectively comprising a perspective view and a plan view of a variant embodiment of a sensor of the invention.

External connections 8 are provided to feed the heating element and the thermometer components. In this variant, it can be seen that face A of the substrate is provided:

in region R1 of the substrate with a heating element 2 and a thermometer component 3; and in region R2 of the substrate with three thermometer components 4a, 4b, and 4c, with the thermometers 4a and 4b being in alignment with the flow axis E, for example, and being disposed on opposite sides of the region R1.

In this variant, face B of the substrate is machined using conventional techniques, e.g. chemical etching using a solution of potassium hydroxide (KOH) so as to obtain a recess 9. All three regions R1, R2, and R3 open out at the same level in the bottom 10 of the recess. In this embodiment, the bottom 10 of the recess 9 is in the form of a cross centered on region R1 and having one of its branches extending in the flow direction E of the fluid.

The recess 9 leaves a membrane between its bottom 10 and the face A, with the thickness of the membrane being equal to the depth of the insulating third region R3.

Figure 11:
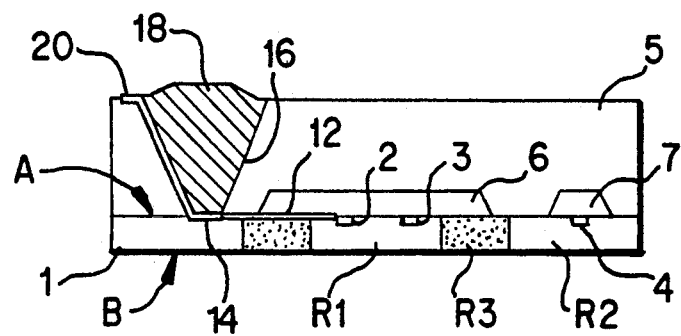
FIG. 11 is a diagrammatic section view through another variant embodiment of a sensor of the invention.

FIG. 11 is a diagrammatic section through a variant embodiment of a sensor of the invention. The second face B is a plane, with the substrate being engraved so as to obtain a substrate thickness that is no greater than the depth of the channel in the third region R3. Such machining is made possible only by the presence of the cap 5 which prevents such a membrane breaking.

Naturally the thermometer components and the heating element provided on face A may be identical to those shown in preceding FIG. 10. Each of them is connected to at least one conducting track 12 which terminates in a conducting tab 14 deposited on face A of the substrate. Each tab 14 is situated facing an opening 16 formed in the cap 5, e.g. by chemical etching using KOH. The wall of each opening 16 may be metal plated. Opening 16 is filled with conducting resin 18 so as to provide an electrical connection between the tab 14 and a tab 20 situated on the cap 5. The thermometer components and the heating element can thus be fed with electricity and the electrical signals delivered by the sensor can be read.

To sum up, the substrate thus includes two faces A and B and is split up into three regions, namely:

a first region R1 which is essentially constituted by silicon and which includes a heating element 2 and optionally at least one thermometer component 3 on face A of the substrate, said region R1 forming a thermal short circuit between faces A and B of the substrate;

a second region R2 essentially constituted by silicon and including one or more thermometer components 4 on face A of the substrate, this region R2 also forming a thermal short circuit between faces A and B of the substrate; and a third region R3 made entirely or in part of oxidized porous silicon which provides thermal insulation and electrical insulation between the regions R1 and R2.

Because of the insulation between the regions R1 and R2 and because of the thermal short circuits that exist between the faces A and B in the regions R1 and R2, it is possible to measure the speed of fluid flow in direction E over face B of the substrate which is specially adapted for this purpose.

As a result, the implants in face A of substrate 1 are no longer exposed to the flowing fluid, thereby avoiding problems of ion contamination in the heating element and in the thermometers, which contamination could affect the stability of the sensor. In addition, region R1 has a very small volume of silicon occupying an area in contact with the fluid that may be large relative to said volume, thus making it possible to control its temperature very well by acting on the heating element.

The flow sensor as described can operate in two different operating modes:

either using the technique of heat dissipation in the flowing fluid, which reduces, for example, to measuring the power required to heat the region R1 while maintaining a constant temperature difference between regions R1 and R2 (e.g. about 10° between the thermometers 3 and 4c);

or else by measuring the speed at which a heat pulse generated in region R1 propagates in the flow direction of the fluid, i.e. given the distance between the thermometers 3 and 4a or 3 and 4b, it suffices to measure the time between emitting such a heat pulse in region R1 and said pulse being detected at one or other of the thermometers 4a and 4b depending on the flow direction; this technique has the further advantage of enabling flow direction to be detected.

We claim:

1. A flow rate sensor comprising a silicon substrate having a first face provided:

with a heating element disposed in a first cylindrical region of said substrate;

with at least one thermometer component disposed in a second region of said substrate; and with a third annular region constituted by at least one insulating channel surrounding said first region, formed of or in part by oxidized porous silicon and isolating said first and second regions from each other;

said substrate having a second face for receiving a flow of fluid;

said first and second regions forming respective very low thermal resistances between said first and second faces of said substrate; and a cap fixed on said first face of said substrate, said cap having at least one cavity formed facing said first region and at least a portion of said third region and said cap being in contact with an interface between said second and said third regions, thereby stiffening said substrate.

2. A sensor according to claim 1, characterized in that the interface between the second and third regions (R2, R3) lies outside the cavity (6).

3. A sensor according to claim 1, characterized in that the first region (R1) is substantially cylindrical, the third region (R3) is constituted by at least one insulating channel surrounding the first region, and the cavity (6) is circular in outline.

4. A sensor according to claim 1, characterized in that to receive the fluid flow, the sensor includes a recess (9) formed in the second face (B) of the substrate (1), all three regions (R1, R2, and R3) opening out at the same level in the bottom (10) of the recess (9).

5. A sensor according to claim 4, characterized in that the recess (9) is in the form of a cross centered on the first region (R1) with one of its branches corresponding to the flow axis of the fluid (E).

6. A sensor according to claim 1, characterized in that to receive the fluid flow, the second face (B) of the substrate (1) is plane, the second face (B) of the substrate (1) being engraved in such a manner that the thickness of the substrate (1) is less than or equal to the thickness of the third region (R3).

7. A sensor according to claim 1, characterized by the fact that the cap (5) is made of silicon, the bond between the cap (5) and said first face (A) being made via a layer of Pyrex.

8. A sensor according to claim 1, characterized by the fact that the cap (5) is made of silicon, the bond between the cap (5) and said first face (A) being made via a layer of siloxane.

9. A sensor according to claim 1, characterized in that the cavity (6) situated facing the first region (R1) and any other cavity (7) that may be formed in the cap facing the first face (A) of the substrate (1) are filled with an inert gas.

10. A sensor according to claim 1, characterized in that the cavity (6) situated facing the first region (R1) and any other cavity (7) that may be formed in the cap facing the first face (A) of the substrate (1) are evacuated.

11. A sensor claim 1, characterized by the fact that the silicon substrate (1) is of the P-type and that the heating element (2) and the thermometer components (3, 4) are directly implanted in the first face (A) of said substrate.

12. A sensor according to claim 1, wherein the third region is constituted by a succession of oxidized porous silicon channels separated by silicon.

13. A sensor according to claim 1, further comprising at least one additional thermometer component in said first region on said first face of said substrate.

* * * * *